UNITED STATES PATENT OFFICE.

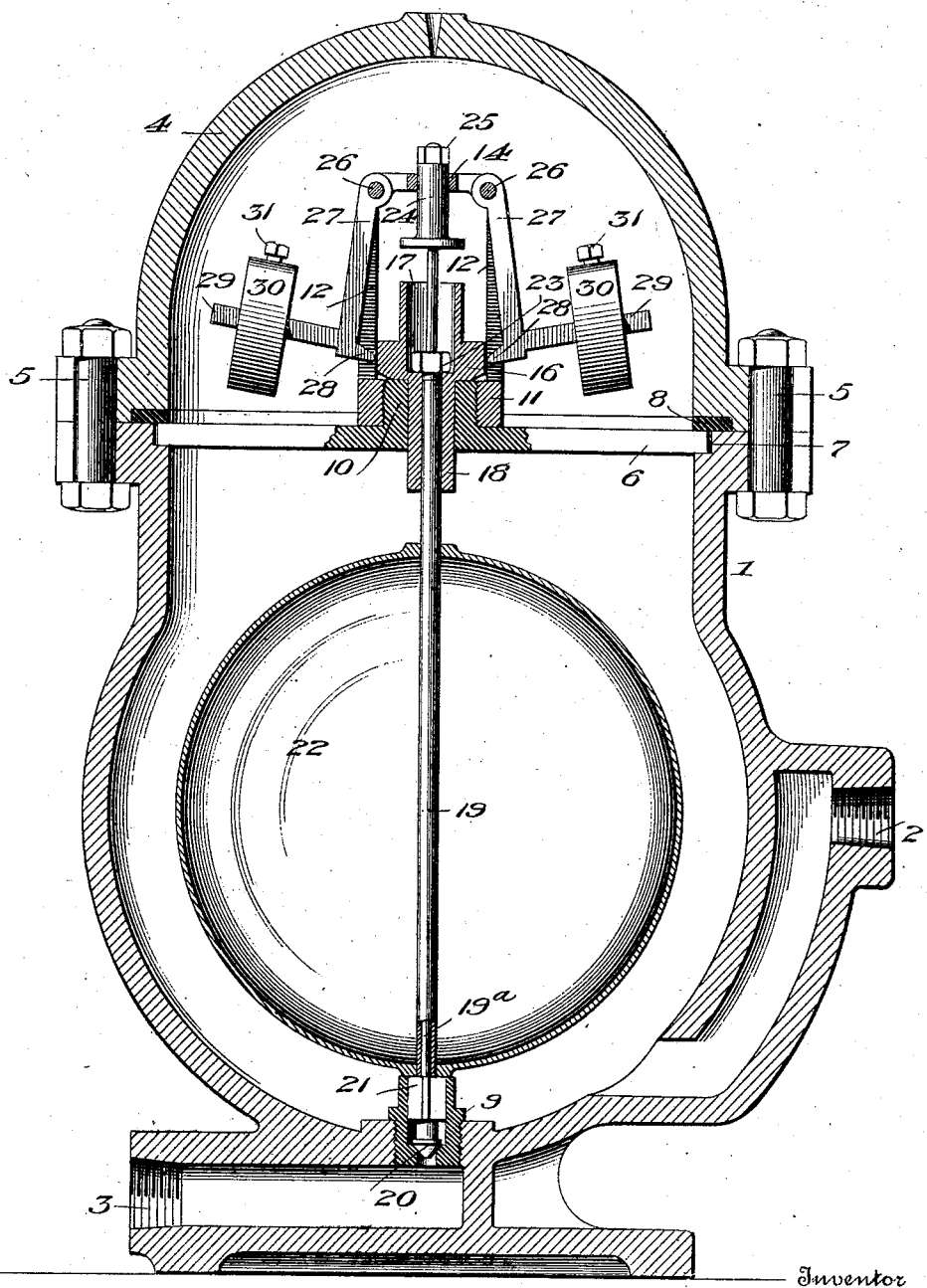

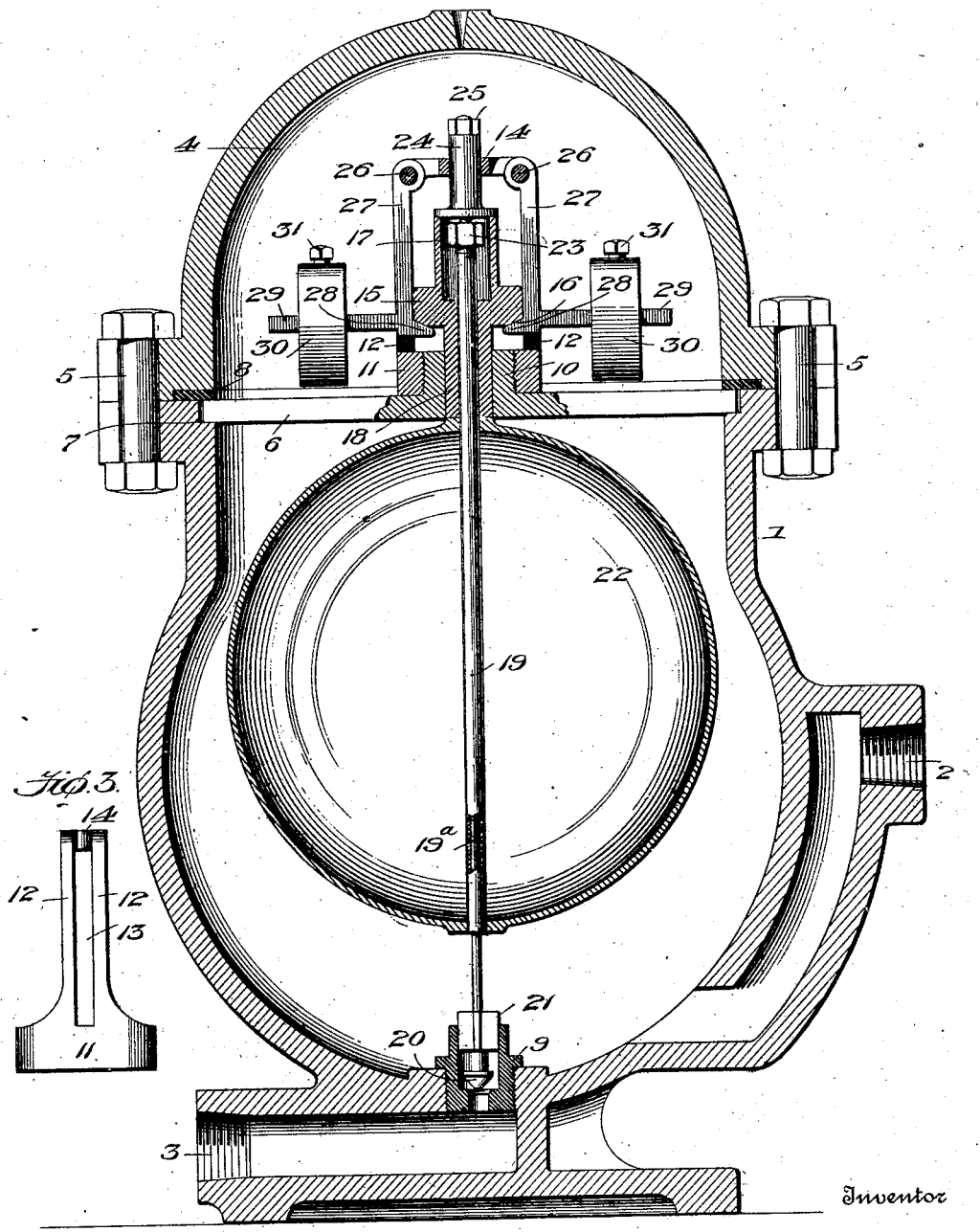

SEBASTIAN STEINMITZ, OF SCRANTON, PENNSYLVANIA.

STEAM-TRAP.

974,201. Specification of Letters Patent. Patented Nov. 1, 1910.

Application filed October 15, 1909. Serial No. 522,878.

*To all whom it may concern:*

Be it known that I, SEBASTIAN STEINMITZ, a citizen of the United States, residing at Scranton, in the county of Lackawanna and State of Pennsylvania, have invented new and useful Improvements in Steam-Traps, of which the following is a specification.

This invention relates to steam traps.

The object of the present invention is the provision of improvements on the steam trap set forth in my Patent No. 755,251, dated March 22, 1904, whereby the trap will be rendered more sensitive in operation wherever it may be placed. As with the trap set forth in my Patent No. 755,251, so the present invention is designed particularly for use in connection with steam boilers. With my patented trap the operation was entirely satisfactory so long as a relatively great volume of condensed steam was admitted, as for instance, when the trap was disposed at some distance from the boiler, but steam condensation is very small at or close to a steam boiler, and when the patented trap was thus located, it has been found not to operate with as great a degree of sensitiveness as was desirable, as when it was located farther from the boiler.

The present invention seeks to overcome the foregoing defects of my earlier construction by having the float loose on the valve stem and with the parts so constructed that the float will serve to open or close the valve only at the substantial limits of the play of said float. Consequently, the condensed steam may accumulate and gradually raise the float without having to do the work of operating the parts until a relatively great amount of condensed steam has accumulated in the casing and the float has been raised considerably, whereupon it immediately opens the valve, the valve is latched in open position, all of the water of condensation allowed to escape, and the float finally again coöperates with the parts to close the valve. Such a structure is very sensitive and will operate with great efficiency wherever it may be placed.

In carrying out the invention, I provide certain novel features of construction in the dogs, which are provided with easily adjustable weights. I also make improvements in the cam which is made adjustable in relation to the valve stem so that any desired regulation may be obtained, and arrange the float and cam for coöperation and provide other novel features and combinations of parts set forth fully hereinafter.

In the accompanying drawings:—Figure 1 is a sectional elevation showing the parts in the position they assume when the valve is closed; Fig. 2, a similar view showing the float raised and the valve locked in open position; and Fig. 3, an end elevation of the supporting bracket.

The casing 1 is provided with a threaded inlet 2 and an outlet 3, the former for admission of the steam and water of condensation, and the latter for the exit of the same. All of the parts of the trap are, by preference, completely inclosed in the casing, the upper part 4 of which is dome shaped and removably connected to the lower part by removable bolts 5.

The spider 6 which supports the dogs and other operative mechanism, has the ends of its arms seated in a recess 7 and is clamped in position by the top 4, a suitable gasket 8 being preferably used.

The water of condensation passes to the outlet 3 through a valve casing shell 9 screwed thereinto.

Connected by a screw-threaded joint 10 to the spider 6 is a bracket 11 composed of vertical guides 12 whose slots 13 are in alinement, a more or less circular base which connects with the spider at 10, and a crosspiece 14.

The numeral 15 designates a cam head having a beveled lower end 16, an upper tubular extension 17, and a lower hollow or tubular guide 18, which is adapted to work up and down in the central hub of the spider 6.

Loose within the cam 15 and guide 18 is the tube 19 which passes through and is secured to a float 22, said tube being provided with a nut 23, on the screw-threaded upper end thereof, said nut lying within the tubular part 17, whereby the relative arrangement of the part 17 and float 22 may be regulated to govern the operation of the device and the seating of the valve 20 whose stem 19$^a$ passes loosely through tube 19 and carries on its screw-threaded upper end a guide 24 which is surmounted by a nut 25 to hold it in proper position on the stem, the lower end of the guide 24 being enlarged and serving as a cap for the tubular part 17. The valve has an extension 21 which is adapted to be engaged by the float 22. It will thus be seen that the float is slidable in relation to the valve and valve-stem, instead of attached thereto, thus differing from my Patent No. 755,251 where the float is attached to the valve-stem.

Extending crosswise of the part 14 of the bracket 11, on opposite sides of the valve-stem, are pivot pins 26 on which the dogs 27 are pivoted. These dogs have vertical stems which are adapted to play in and be guided by the slots 13 and are provided with toes 28 adapted to bear against the edges of the cam 15 or to take against the beveled under surface 16 thereof, according as the valve is closed or opened. The dogs are provided with tails 29 on which are weights 30 which are adjustable lengthwise of said tails and adapted to be secured where adjusted by set screws 31.

Assuming that the valve 20 is seated and the float is down and resting on the base or extension 21, the parts are then in the position shown in Fig. 1. As the water of condensation accumulates in the casing 1, it lifts the float, the latter rising easily on the valve-stem, the valve remaining closed as the water accumulates until the float finally engages the projecting lower end of the guide 18, whereupon the cam rises slightly with the float until the cam surface 16 is opposite the toes 28, whereupon the gravitation of the weights 30 causes the toes to elevate the cam, and upon the engagement of the cam with the guide 24, the valve is thereafter completely opened by the further action of said toes and cam, the parts being then in the position shown in Fig. 2. The water having drained from the casing through the outlet 3, the float descends, but during its descent, the cam and the valve are held raised by the dogs, whose toes continue their engagement with the cam. The weight of the float is sufficient, however, immediately the nut 23 strikes the bottom of the tubular extension 17, to overcome the engagement of the toes 28 and the cam 16, and the descent of the cam spreads the dogs. The float finally sinks into contact with the projection 21 and thereby closes the valve, as shown in Fig. 1.

In my Patent No. 755,251, the slightest lifting of the float will cause a corresponding opening of the valve and, similarly, immediately the water starts to pass out of the trap, the float and valve descend together and the valve is closed, but with the present invention, the valve remains closed until the float has completed its rise and, also, the valve remains open until all of the water has passed from the trap and the float has again descended to the bottom of the casing.

Having thus described my invention, what I claim as new and desire to secure by Letters Patent, is:—

1. In a steam trap, the combination with a casing, of a valve controlling the outlet from the casing, a valve-stem, a cam head concentric with said valve-stem and movable thereon, a movable locking member adapted to coöperate with the cam head aforesaid to hold the valve in open position, and a float in the casing which is movable in relation to the valve and cam head and is adapted, under the influence of the water in the casing, to move the cam head so that it will be engaged by the movable locking member at one limit of its play, and at the other limit of its play to close the valve.

2. In a steam trap, the combination with a casing, of a valve controlling the outlet from the casing, a valve-stem, a movable tubular cam head adapted for operative engagement with said valve-stem and adapted for shifting the valve-stem, means adapted to sustain the movable cam head when in a predetermined position, and a float in the casing which is movable in relation to the valve and the cam head aforesaid and is adapted, under the influence of the water in the casing, to engage and move the said cam head so that it will be held by the sustaining means aforesaid at one limit of the play of said float, and at the other limit of its play to close the valve.

3. In a steam trap, the combination with a casing, of a valve controlling the outlet from the casing, a valve-stem, a cammed locking device through which the valve-stem loosely passes, means for adjustably supporting the valve-stem from the said movable locking device, a pivoted weighted dog having a toe adapted to engage the cam of the movable locking device when the latter is shifted to thereby sustain the valve in open position, and a float slidable freely on the valve-stem and adapted, under the influence of the water in the casing, to engage and move the cammed locking device on the rising of the water and, to move independently of the valve-stem to close the valve on the outflow of the water.

In testimony whereof I have signed my name to this specification in the presence of two subscribing witnesses.

SEBASTIAN STEINMITZ.

Witnesses:
  SOL. MILLER,
  C. A. NICHOLSON.